US011915708B2

(12) United States Patent
Lokanath et al.

(10) Patent No.: US 11,915,708 B2
(45) Date of Patent: Feb. 27, 2024

(54) METHODS AND SYSTEMS FOR INVOKING A USER-INTENDED INTERNET OF THINGS (IOT) DEVICE FROM A PLURALITY OF IOT DEVICES

(71) Applicant: Samsung Electronics Co., Ltd., Suwon-si (KR)

(72) Inventors: Manjunath Belgod Lokanath, Suwon-si (KR); Rituraj Kabra, Suwon-si (KR); Rishabh Shukla, Suwon-si (KR); Lokesh Kumar, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 17/569,394

(22) Filed: Jan. 5, 2022

(65) Prior Publication Data

US 2022/0301568 A1 Sep. 22, 2022

Related U.S. Application Data

(63) Continuation of application No. PCT/KR2021/019046, filed on Dec. 15, 2021.

(30) Foreign Application Priority Data

Mar. 18, 2021 (IN) .............................. 202141011575

(51) Int. Cl.
*G10L 17/22* (2013.01)
*H04L 67/12* (2022.01)
(Continued)

(52) U.S. Cl.
CPC .............. *G10L 17/22* (2013.01); *G10L 17/02* (2013.01); *G10L 17/06* (2013.01); *G10L 25/51* (2013.01);
(Continued)

(58) Field of Classification Search
CPC ......... G10L 17/22; G10L 17/02; G10L 17/06; G10L 25/51; G10L 25/90; G10L 67/12; G16Y 40/35
See application file for complete search history.

(56) References Cited

U.S. PATENT DOCUMENTS 9,875,081 B2 * 1/2018 Meyers .................. G10L 15/00
10,001,759 B2 6/2018 Gupta
(Continued)

FOREIGN PATENT DOCUMENTS

KR 10-2062580 B1 2/2020
WO WO-2017044629 A1 * 3/2017 ............. G06F 3/167

OTHER PUBLICATIONS

International Search Report and Written Opinion of the International Searching Authority in connection with International Application No. PCT/KR2021/019046 dated Mar. 31, 2022, 10 pages.
(Continued)

*Primary Examiner* — Mohammad K Islam (57) ABSTRACT

A method for invoking a user-intended Internet of Things (IoT) device amongst a number of IoT devices is disclosed. The method includes extracting by the number of IoT devices, a number of voice parameters from a voice wakeup command for waking up the device. The method includes sharing by the number of IoT devices, the number of voice parameters amongst the number of IoT devices. The method includes comparing the number of voice parameters with a number of pre-stored voice parameters in the number of IoT devices. The method includes determining, a user-intended IoT device amongst the number of IoT devices based on the voice wakeup command and at least one of a similarity between the plurality of pre-stored voice parameters and the plurality of voice parameters and a previously invoked IoT device associated with a previous voice wakeup command.

(Continued)

The method includes invoking the user-intended IoT device selected amongst the number of IoT devices.

20 Claims, 8 Drawing Sheets

(51) Int. Cl.
*G10L 25/90* (2013.01)
*G10L 17/06* (2013.01)
*G10L 25/51* (2013.01)
*G10L 17/02* (2013.01)
*G16Y 40/35* (2020.01)

(52) U.S. Cl.
CPC .............. *G10L 25/90* (2013.01); *H04L 67/12* (2013.01); *G16Y 40/35* (2020.01)

(56) References Cited

U.S. PATENT DOCUMENTS

| | | | |
|---|---|---|---|
| 10,403,276 B2* | 9/2019 | SaganeGowda | G10L 15/22 |
| 10,425,780 B1* | 9/2019 | Devaraj | G10L 15/22 |
| 10,425,781 B1* | 9/2019 | Devaraj | H04W 8/186 |
| 10,536,287 B1* | 1/2020 | Leblang | G10L 15/22 |
| 10,546,583 B2* | 1/2020 | White | G10L 15/28 |
| 10,685,652 B1* | 6/2020 | Cherukuri | G10L 25/51 |
| 10,701,067 B1* | 6/2020 | Ziraknejad | H04W 12/63 |
| 10,878,812 B1* | 12/2020 | Helwani | G10L 25/84 |
| 11,069,364 B1* | 7/2021 | Souza | H04R 5/04 |
| 11,132,991 B2 | 9/2021 | Park et al. | |
| 11,133,027 B1* | 9/2021 | Hardie | G10L 15/20 |
| 2006/0015333 A1 | 1/2006 | Gao | |
| 2012/0089396 A1 | 4/2012 | Patel et al. | |
| 2014/0167929 A1 | 6/2014 | Shim et al. | |
| 2016/0358614 A1* | 12/2016 | Phielipp | G10L 19/018 |
| 2017/0025124 A1* | 1/2017 | Mixter | G10L 15/22 |
| 2018/0211665 A1 | 7/2018 | Park et al. | |
| 2019/0362715 A1* | 11/2019 | Aggarwal | G06F 3/167 |
| 2019/0392834 A1 | 12/2019 | Yi et al. | |
| 2020/0020339 A1 | 1/2020 | Chae | |
| 2020/0043490 A1 | 2/2020 | Park | |
| 2021/0026593 A1* | 1/2021 | Wang | G10L 15/1822 |
| 2021/0375275 A1* | 12/2021 | Yoon | G10L 15/20 |
| 2022/0084540 A1* | 3/2022 | Kim | G10L 19/018 |
| 2022/0279063 A1* | 9/2022 | Coffman | G06F 3/0482 |
| 2023/0096372 A1* | 3/2023 | Wang | H04W 12/63 726/26 |

OTHER PUBLICATIONS

Office Action dated Sep. 11, 2022 in connection with India Patent Application No. 202141011575, 6 pages.

* cited by examiner

METHODS AND SYSTEMS FOR INVOKING A USER-INTENDED INTERNET OF THINGS (IOT) DEVICE FROM A PLURALITY OF IOT DEVICES

CROSS-REFERENCE TO RELATED APPLICATIONS

This application is a continuation of International Application No. PCT/KR2021/019046 filed on Dec. 15, 2021, which claims priority to India Patent Application No. 202141011575 filed on Mar. 18, 2021, the disclosures of which are herein incorporated by reference in their entirety.

BACKGROUND

1. Field

The present disclosure generally relates to Internet of Things (IoT) environment, and particularly relates to methods and systems for invoking a user-intended IoT device amongst a plurality of IoT devices.

2. Description of Related Art

Traditionally, in an IoT environment, each IoT device responds to a different command for invoking or performing a certain task. In an example, the nearest device from a user receives the command and determines whether the command is to be responded by the nearest device. When it is determined that the command is to be responded by some other device, the nearest device transmits the command to the other devices. Further, the command is responded and the task is performed.

However, the above mentioned technique includes a number of drawbacks such as the devices taking more time for computation and hence the response may get delayed. Furthermore, only the nearest device receives the command and further transmits the command to other devices upon ascertaining a targeted device from the other devices.

Furthermore, the targeted devices transmit the response through the device that received the command from the user, hence the computation time increases and responses further get delayed.

There is a need for a solution to overcome the above-mentioned drawbacks.

SUMMARY

In accordance with the purposes of the disclosure, the present disclosure as embodied and broadly described herein, describes method and system for invoking an IoT device from a plurality of IoT devices.

In accordance with some example embodiments, a method for invoking a user-intended Internet of Things (IoT) device amongst a number of IoT devices is disclosed. The method includes, extracting, by the number of IoT devices, a number of voice parameters from a voice wakeup command for waking up the device as received at the number of IoT devices. The method includes, sharing, by the number of IoT devices, the number of voice parameters amongst the number of IoT devices. The method includes comparing, by the number of IoT devices, the number of voice parameters with a number of pre-stored voice parameters in the number of IoT devices, wherein the pre-stored voice parameters corresponding to runtime-data or learned data. The method includes, determining, by the plurality of IoT devices, the user-intended IoT device amongst the plurality of IoT devices based on the voice wakeup command and at least one of a similarity between the plurality of pre-stored voice parameters and the plurality of voice parameters and a previously invoked IoT device associated with a previous voice wakeup command. The method includes, invoking the user-intended IoT device selected amongst the plurality of IoT devices.

In accordance with some example embodiments, a system for invoking a user-intended Internet of Things (IoT) device amongst a number of IoT devices is disclosed. The system includes an extracting module configured in the number of IoT devices to extract a number of voice parameters from a voice wakeup command for waking up the device as received at the number of IoT devices. The system includes a sharing module configured in the number of IoT devices to share the number of voice parameters amongst the number of IoT devices. The system includes a machine learning (ML) module configured in the number of IoT devices to compare the number of voice parameters with a number of pre-stored voice parameters in the number of IoT devices, wherein the pre-stored voice parameters corresponding to runtime-data or learned data. The ML module further determines the user-intended IoT device amongst the plurality of IoT devices based on the voice wakeup command and at least one of a similarity between the plurality of pre-stored voice parameters and the plurality of voice parameters and a previously invoked IoT device associated with a previous voice wakeup command. The ML module also invokes the user-intended IoT device selected amongst the number of IoT devices.

In accordance with some example embodiments, a method for invoking a user-intended Internet of Things (IoT) device amongst a number of IoT devices is disclosed. The method includes, extracting, by the number of IoT devices, a number of voice parameters from a voice wakeup command for waking up the device as received at the number of IoT devices. The method includes, sharing, by the number of IoT devices, the number of voice parameters amongst the number of IoT devices. The method includes comparing, by the number of IoT devices, the number of voice parameters with a number of pre-stored voice parameters in the number of IoT devices, wherein the pre-stored voice parameters corresponding to runtime-data or learned data. The method includes, determining, by the number of devices, the user-intended IoT device amongst the number of IoT devices based on the voice wakeup command. The method includes, invoking, the user-intended IoT device selected amongst the number of IoT devices based on one or more of a processing of the voice wakeup command, a similarity between the number of pre-stored voice parameters and the number of voice parameters, and the user-intended IoT device for waking up the selected IoT device.

In accordance with some example embodiments, a system for invoking a user-intended Internet of Things (IoT) device amongst a number of IoT devices is disclosed. The system includes an extracting module configured in the number of IoT devices to extract a number of voice parameters from a voice wakeup command for waking up the device as received at the number of IoT devices. The system includes a sharing module configured in the number of IoT devices to share the number of voice parameters amongst the number of IoT devices. The system includes a machine learning (ML) module configured in the number of IoT devices to compare the number of voice parameters with a number of pre-stored voice parameters in the number of IoT devices, wherein the pre-stored voice parameters corresponding to runtime-data or learned data. The ML module further determines the user-intended IoT device amongst the number of IoT devices based on the voice wakeup command. The ML module also invokes, the user-intended IoT device amongst the number of IoT devices based on one or more of a processed voice wakeup command and a maximum similarity between the number of pre-stored voice parameters and the number of voice parameters and the user-intended IoT device for waking up the selected IoT device.

These aspects and advantages will be more clearly understood from the following detailed description taken in conjunction with the accompanying drawings and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

For the sake of clarity, the first digit of a reference numeral of each component of the present disclosure is indicative of the Figure number, in which the corresponding component is shown. For example, reference numerals starting with digit "1" are shown at least in FIG. 1. Similarly, reference numerals starting with digit "2" are shown at least in FIG. 2, and so on and so forth.

Embodiments of the present subject matter are described below in detail with reference to the accompanying drawings.

Figure 1:
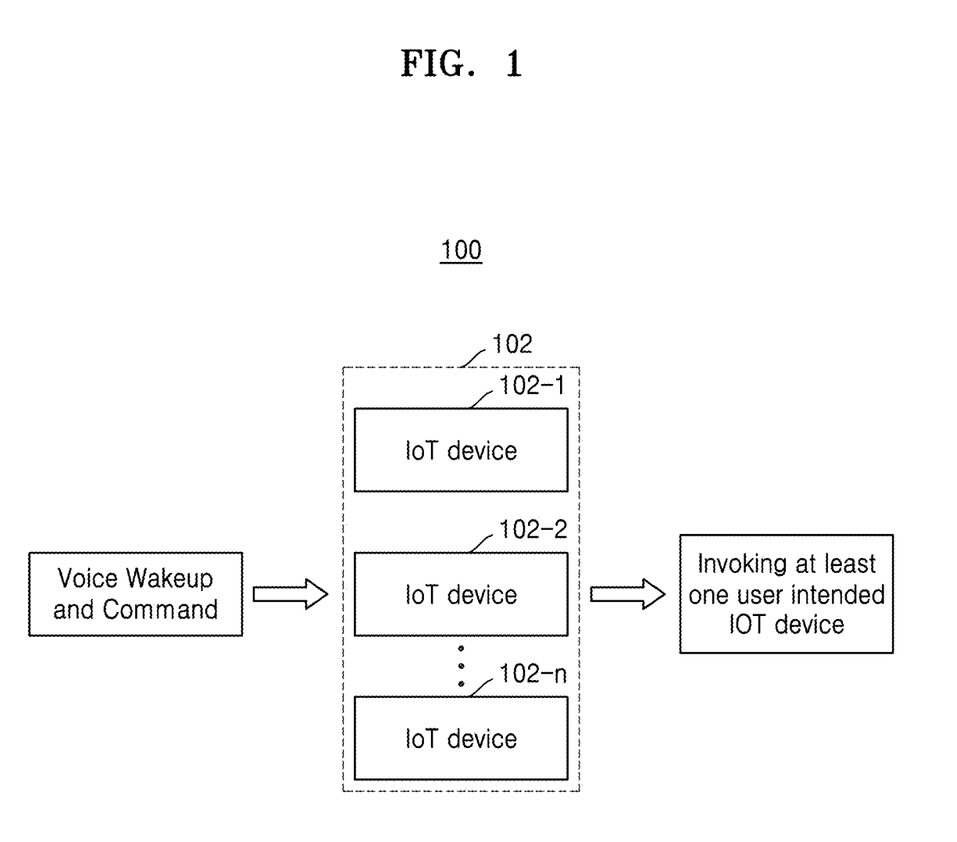
FIG. 1 illustrates a network environment for invoking a user-intended Internet of Things (JOT) device amongst a plurality of IoT devices, in accordance with an embodiment.

FIG. 1 illustrates an IoT environment 100 for invoking a user-intended Internet of Things (IoT) device 102 amongst a number of IoT devices (102-1, 102-2, . . . 102-n) present in the IoT environment, in accordance with an embodiment. In an embodiment, invoking any of the number of IoT devices 102 may be based on receiving a voice wakeup command from a user at the number of IoT devices 102. In an embodiment, the voice wakeup command may be specific to each of the number of IoT devices 102 such that the voice wakeup command may pertain to perform a device specific task. In an embodiment, the voice wakeup command may be generic for the number of IoT devices 102 such that the voice wakeup command may pertain to powering any of the number of IoT devices on/off. Examples of the number of IoT devices 102 may include, but are not limited to, a smart phone, a computer, a tab, a laptop, a television, a speaker, an air conditioner, a refrigerator or the like. In an embodiment, any device capable of connecting to internet may be configured as the IoT device 102.

According to an aspect of the present subject matter, the number of IoT devices 102 may be configured to extract a number of voice parameters from the voice wakeup command received, as depicted above. In an embodiment, the voice wakeup command may be intended to wake up at least one of the number of IoT devices 102. In an embodiment, the voice wakeup command may be intended to perform a particular action specific to one of the number of IoT devices 102. Furthermore, for waking up the user-intended IoT device 102 amongst the IoT devices 102, the number of IoT devices 102 may be configured to share the number of voice parameters extracted from the voice wakeup command with one another. In an embodiment, the number of IoT devices 102 may include a number of pre-stored voice parameters associated with one or more previous voice wakeup commands previously received and processed by the number of IoT devices 102. In an embodiment, the number of pre-stored voice parameters may correspond to run-time data or learned data.

The number of IoT devices 102 may be configured to compare the number of voice parameters with the number of pre-stored voice parameters. In an embodiment, the number of pre-stored voice parameters may be extracted upon receiving at least one previous voice wakeup command by the number of IoT devices 102. Thus, the number of IoT devices 102 may be configured to store the number of voice parameters extracted from at least one previous voice wakeup command. The number of voice parameters extracted from at least one previous voice wakeup command may be used when receiving a next voice wakeup command.

Upon comparing the number of voice parameters with the number of pre-stored voice parameters by the number of IoT devices 102, the user-intended IoT device 102 amongst the number of IoT devices 102 may be determined. Furthermore, the number of IoT devices may be configured to invoke an IoT device from the number of IoT devices 102 based on one or more of a processing of the voice wakeup command, a similarity between the number of pre-stored voice parameters and the number of voice parameters, and the user-intended IoT device for waking up the IoT device selected from the number IoT devices 102.

Figure 2:
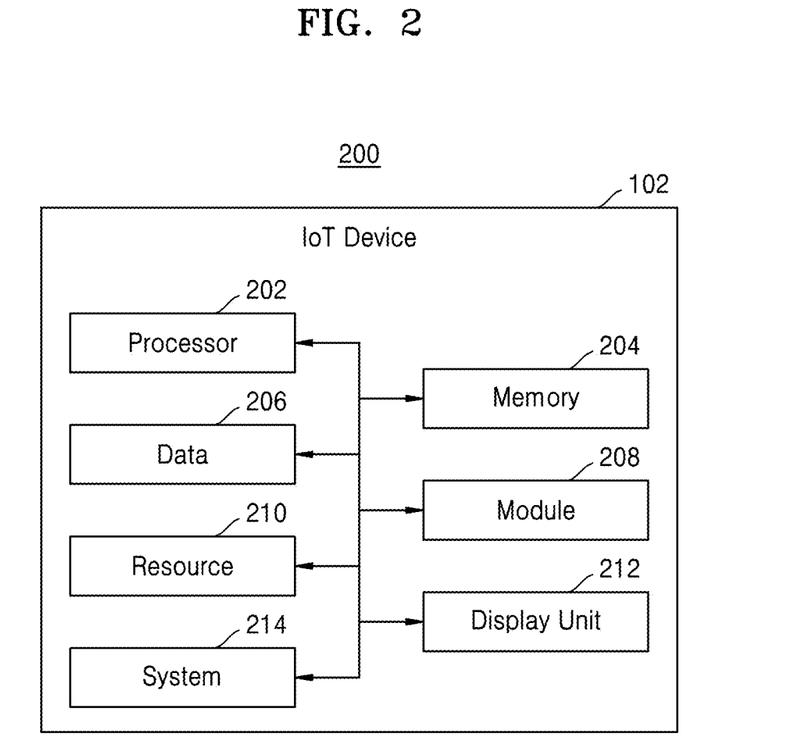
FIG. 2 illustrates a schematic block diagram of the IoT device incorporating a system for invoking the IoT device, in accordance with an embodiment.

FIG. 2 illustrates a schematic block diagram 200 of an IoT device 102 amongst the number of IoT devices 102 to be invoked based on a voice wakeup command, in accordance with an embodiment. Examples of the number of IoT devices 102 may include, but are not limited to, a smart phone, a computer, a tab, a laptop, a television, a speaker, an air conditioner, a refrigerator or the like. In an embodiment, any device capable of connecting to internet may be configured as the IoT device 102. Furthermore, selection of the user-intended IoT device 102 to be invoked may be entirely performed by the number of IoT devices 102. In an embodiment, the selection of one of the number of IoT devices 102 may be dependent on a number of voice parameters extracted from the voice wakeup command. Examples of the number of voice parameters may include, but are not limited to, a Signal To Noise ratio, distance of a voice wakeup command source from the number of IOT devices, a direction of the voice wakeup command source, a time of receiving the voice wakeup command, a background noise, a voice print associated with the voice wakeup command wake-up, and the previously invoked user device associated with handling one or more user requested actions.

In an example, the IoT device 102 may include a processor 202, a memory 204, data 206, module (s) 208, resource (s) 210, a display unit 212, and a system 214. In an example, the processor 202, the memory 204, data 206, the module(s) 208, resource (s) 210, the display unit 212, and the system 214 may be communicatively coupled to one another.

As would be appreciated, the IoT device 102, may be understood as one or more of a hardware, a configurable hardware, and the like. In an example, the processor 202 may be a single processing unit or a number of units, all of which could include multiple computing units. The processor 202 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 202 may be configured to fetch and/or execute computer-readable instructions and/or data stored in the memory 204.

In an example, the memory 204 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 204 may include the data 206.

The data 206 serves, amongst other things, as a repository for storing data processed, received, and generated by one or more of the processor 202, and the system 214. In an example, the data 206 may further include a database storing values pertaining to the number of voice parameters associated the voice wakeup command received at the IoT device 102. In an embodiment, the data 206 may further include, run-time data, learned data, a number of previous voice wakeup commands, a number of pre-stored voice parameters extracted from the number of previous commands.

The module(s) 208, amongst other things, may include routines, programs, objects, components, data structures, etc., which perform particular tasks or implement data types. The module(s) 208 may also be implemented as, signal processor(s), state machine(s), logic circuitries, and/or any other device or component that manipulate signals based on operational instructions.

Further, the module(s) 208 may be implemented in hardware, instructions executed by at least one processing unit, for e.g., processor 202, or by a combination thereof. The processing unit may be a general-purpose processor which executes instructions to cause the general-purpose processor to perform operations or, the processing unit may be dedicated to performing the required functions. In another aspect of the present disclosure, the module(s) 208 may be machine-readable instructions (software) which, when executed by a processor/processing unit, may perform any of the described functionalities.

In some example embodiments, the module(s) 208 may be machine-readable instructions (software) which, when executed by a processor/processing unit, perform any of the described functionalities.

The resource(s) 210 may be physical and/or virtual components of the IoT device 102 that provide inherent capabilities and/or contribute towards the performance of the IoT device 102. Examples of the resource(s) 210 may include, but are not limited to, a memory (e.g., the memory 204), a power unit (e.g. a battery), a display unit (the display unit 212), etc. The resource(s) 210 may include a power unit/battery unit, a network unit, etc., in addition to the processor 202, and the memory 204.

The display unit 212 may display various types of information (for example, media contents, multimedia data, text data, etc.) on the IoT device 102. The display unit 212 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display.

According to aspects of the present subject matter, the system 214 may be incorporated in each of the number of IoT devices 102 such that the system 214 may be configured to process the voice wakeup command received at each of the number of IoT device 102 for determining the user-intended IoT device 102 to be invoked. In an embodiment, the system 214 may be configured to employ one or more ML (Machine Learning) techniques for determining the user-intended IoT device 102 for invoking. Examples of the one or more ML technique may include, but are not limited to logistic regression, naïve bayes, random forest or the like. In an embodiment, the system 214 may be configured to receive the voice wakeup command from a user for invoking the IoT device 102 amongst the IoT devices 102. Upon receiving the command, the system 214 incorporated in the number of IoT devices 102 may be configured to process the voice wakeup command such that the number of voice parameters may be extracted from the voice wakeup command at the number of IoT devices 102.

In the above embodiment, the system 214 in the number of IoT devices 102 may be configured to share the number of voice parameters with the number of IoT devices 102 upon extraction. Thus, the number of voice parameters extracted at each of the number of IoT devices 102 may be shared between the number of IoT devices 102.

To that understanding, upon receiving the number of voice parameters extracted from each of the number of IoT devices 102, the system 214 within each of the number of IoT devices 102 may be configured to perform a comparison operation. In an embodiment, the comparison may be performed between the number of voice parameters and the number of pre-stored voice parameters previously stored at the number of IoT devices 102 for determining a similarity between the number of voice parameters and the number of pre-stored voice parameters. In an embodiment, the number of pre-stored voice parameters may be related to the number of previous voice wakeup commands received at the number of IoT devices 102 prior to receiving the voice wakeup command.

Further, based on an outcome related to the comparison operation, the system 214 may be configured to identify the user-intended IoT device 102 amongst the number of IoT devices 102 with a maximum similarity between the number of voice parameters and the number of pre-stored voice parameters.

The system 214 may be configured to determine a user-intended IoT device amongst the number of IoT devices 102 based on the voice wakeup command. In an embodiment, the system 214 may be configured to determine the user-intended device as a previously invoked IoT device amongst the number of IoT devices 102 based on invoking data.

In an embodiment, the invoking data may define a relationship between the voice wakeup command and the previously invoked IoT devices 102 based on the one or more previous voice wakeup commands. Furthermore, the system 214 may be configured to process the invoking data for determining a relationship between the voice wakeup command and the previously invoked IoT devices and generate processed invoking data. Further, the system 214 may be configured to determine the previously invoked IoT device based on the processed invoking data. For example, assuming that a device A was previously invoked according to the voice wakeup command B, then the system 214 may be configured to generate the invoking data indicating a mapping relationship between the voice wakeup command B and the previously invoked IoT device A in the above embodiment, the system 214 may be configured to invoke the user-intended IoT device 102 selected amongst the number of IoT devices 102 based on one or more of a processing of the voice wakeup command, the similarity between the number of pre-stored voice parameters and the number of voice parameters, and the user-intended IoT device for waking up the selected IoT device 102. Constructional and operational details of the system 214 are explained in detail in the description of FIG. 3.

Figure 3:
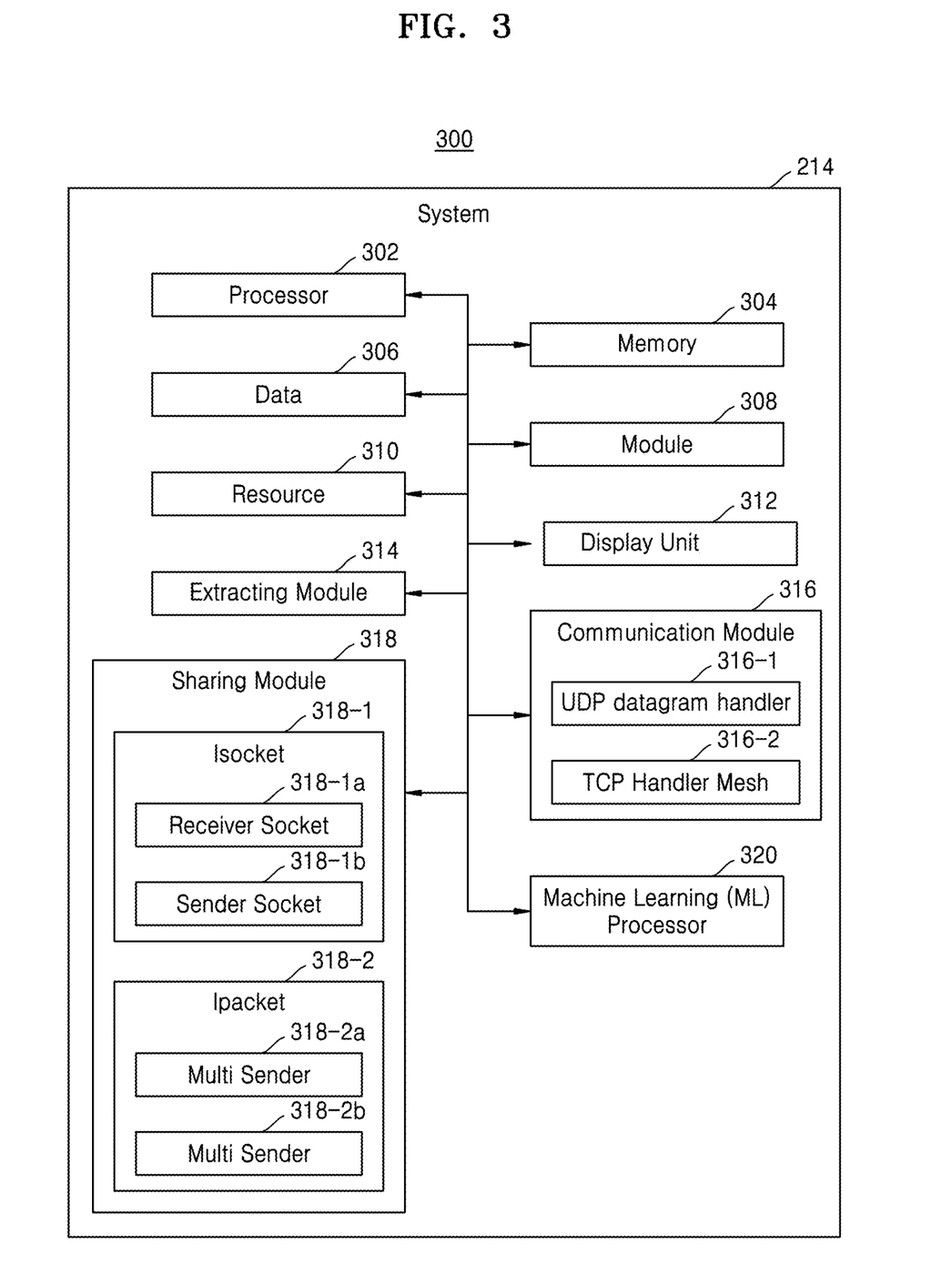
FIG. 3 illustrates a schematic block diagram of the system incorporated in each of the number of IoT devices for invoking the user-intended IoT device amongst the number of IoT devices, in accordance with an embodiment.

FIG. 3 illustrates a schematic block diagram 300 of the system 214 for invoking the user-intended IoT device 102 amongst the number of IoT devices 102, in accordance with an embodiment. In an embodiment, the system 214 may be incorporated in each of the number of IoT devices 102 such that the number of IoT devices 102 may be configured to communicate with one another. In an embodiment, the system 214 may employ one or more ML techniques for determining the user-intended IoT device 102 for invoking. Examples of the one or more ML techniques, but are not limited to, logistic regression, naïve bayes, random forest or the like. Further, the system 214 may be configured to invoke the IoT device 102 based on voice wakeup command received from a user. Further, determining the user-intended IoT device 102 amongst the number of IoT devices 102 intended by the user for invoking may be based on a number of voice parameters related to the voice wakeup command. In an embodiment, the system 214 includes, a processor 302, a memory 304, data 306, module(s) 308, resource(s) 310, a display unit 312, an extracting module 314, a communication module 316, a sharing module 318, and a ML module 320. In an embodiment, the processor 302, the memory 304, the data 306, the module(s) 308, the resource(s) 310, the display unit 312, the extracting module 314, the communication module 316, the sharing module 318, and the ML module 320 may be communicatively coupled to one another.

At least one of the plurality of modules may be implemented through an AI model. A function associated with AI may be performed through the non-volatile memory or the volatile memory, and/or the processor.

The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

A plurality of processors control the processing of the input data in accordance with a predefined operating rule or artificial intelligence (AI) model stored in the non-volatile memory or the volatile memory. The predefined operating rule or artificial intelligence model is provided through training or learning. Here, being provided through learning means that, by applying a learning technique to a plurality of learning data, a predefined operating rule or AI model of a desired characteristic is made. The learning may be performed in a device itself in which AI according to an embodiment is performed, and/or may be implemented through a separate server/system. The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

According to the present subject matter, in a method of an electronic device, a method to invoke the user-intended IoT device amongst the number of the IoT devices may receive a speech signal, which is an analog signal, via (e.g., a microphone) and convert the speech part into computer readable text using an automatic speech recognition (ASR) model. The user's intent of utterance may be obtained by interpreting the converted text using a natural language understanding (NLU) model. The ASR model or NLU model may be an artificial intelligence model. The artificial intelligence model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training technique. The artificial intelligence model may include a plurality of neural network layers. Each of the plurality of neural network layers includes a plurality of weight values and performs neural network computation by computation between a result of computation by a previous layer and the plurality of weight values.

Language understanding is a technique for recognizing and applying/processing human language/text and includes, e.g., natural language processing, machine translation, dialog system, question answering, or speech recognition/synthesis.

As would be appreciated, the system 214, may be understood as one or more of a hardware, a software, a logic-based program, a configurable hardware, and the like. In an example, the processor 302 may be a single processing unit or a number of units, all of which could include multiple computing units. The processor 302 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 302 may be configured to fetch and/or execute computer-readable instructions and/or data stored in the memory 304.

In an example, the memory 304 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 304 may include the data 306.

The data 306 serves, amongst other things, as a repository for storing data processed, received, and generated by one or more of the processor 302, the module(s) 308, the resource(s) 310, the extracting module 314, the communication module 316, the sharing module 318, and the ML module 320. In an example, the data 306 may further include a database storing values pertaining to the number of voice parameters associated the voice wakeup command received at the IoT device 102. In an embodiment, the data 206 may further include, run-time data, learned data, a number of previous voice wakeup commands, a number of pre-stored voice parameters extracted from the number of previous commands.

The module(s) 308, amongst other things, may include routines, programs, objects, components, data structures, etc., which perform particular tasks or implement data types. The module(s) 308 may also be implemented as, signal processor(s), state machine(s), logic circuitries, and/or any other device or component that manipulate signals based on operational instructions.

Further, the module(s) 308 may be implemented in hardware, instructions executed by at least one processing unit, for e.g., processor 302, or by a combination thereof. The processing unit may be a general-purpose processor which executes instructions to cause the general-purpose processor to perform operations or, the processing unit may be dedicated to performing the required functions. In another aspect of the present disclosure, the module(s) 308 may be machine-readable instructions (software) which, when executed by a processor/processing unit, may perform any of the described functionalities.

In some example embodiments, the module(s) 308 may be machine-readable instructions (software) which, when executed by a processor/processing unit, perform any of the described functionalities.

The resource(s) 310 may be physical and/or virtual components of the system 214 that provide inherent capabilities and/or contribute towards the performance of the system 214. Examples of the resource(s) 310 may include, but are not limited to, a memory (e.g., the memory 304), a power unit (e.g. a battery), a display unit, etc. The resource(s) 310 may include a power unit/battery unit, a network unit, etc., in addition to the processor 302, and the memory 304.

The display unit 312 may display various types of information (for example, media contents, multimedia data, text data, etc.) on the IoT device 102. The display unit 312 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display.

In an embodiment, the extracting module 314 incorporated in the system 214 pertaining to the number of IoT devices 102 may be configured to receive the voice wakeup command from the user. In an embodiment, the extracting module 314 may include a Digital Signal Processing (DSP) chip for receiving the voice wakeup command. In an embodiment, the DSP chip may be capable of awakening upon sensing the voice wakeup command. Further, the extracting module 314 may be configured extract the number of voice parameters from the voice wakeup command. In an embodiment, the extracting module 314 may be configured to process the voice wakeup command for extracting the number of voice parameters from the voice wakeup command. Examples of the number of voice parameters may include, but are not limited to, a Signal To Noise Ratio (SNR), a distance of a voice wakeup command source from the number of IoT devices 102, a direction of the voice wakeup command source, a time of receiving the voice wakeup command, a background noise, and a voice print.

In an embodiment, extracting the number of voice parameters may be pivotal for determining the IoT device 102 amongst the number of IoT devices 102 as the user-intended IoT device for invoking. In an embodiment, the number of voice parameters may be extracted from the voice wakeup command at each of the number of IoT devices 102.

In the above embodiment, the communication module 316 incorporated in each of the number of IoT devices 102 may be configured to transmit the number of voice parameters to the ML module 320 within a same IoT device 102 amongst the number of IoT devices 102 for further processing and computing. In an embodiment, the communication module 316 may be configured to transmit the number of voice parameters to the sharing module 318 within a same IoT device 102 amongst the number of IoT devices 102. In an embodiment, the communication module 316 may be a Wi-Fi local connector including a UDP datagram handler 316-1, TCP packet handler mesh 316-2 for transmitting the number of voice parameters and an IP broadcast.

The sharing module 318 incorporated in the number of IoT devices 102 may be configured to share the number of voice parameters with the sharing modules 318 incorporated in the number of IoT devices 102. In an embodiment, the sharing of the number of voice parameters within the number of IoT devices 102 may be initiated in response to the extracting of the number of voice parameters by the extracting module 314. Furthermore, each sharing module 318 in each of the number of IoT devices 102 may be configured to receive the number of voice parameters from the number of IoT devices 102.

Further, the sharing module 318 may further be configured to transmit the number of voice parameters received from the number of IoT device 102 to the ML module 320 incorporated within the system 214 of each of the number of IoT devices 102 according to various communication protocol such as TCP (Transmission Control Protocol) or UDP (User Datagram Protocol). In an embodiment, the sharing module 318 may include an Isocket 318-1 and an Ipacket 318-2. The Isocket 318-1 may communicate with other IoT devices through UDP, and the Ipacket 318-2 may communicate with other IoT devices through TCP. Further, the Isocket 318-1 may include a receiver socket 318-1*a* and a sender socket 318-1*b*. Furthermore, the Ipacket 318-2 may include a multi receiver 318-2*a* and a multi sender 318-2*b*. In an embodiment, the Isocket 318-1 and the Ipacket 318-2 may be configured to communicate with the ML module 320 for receiving a message regarding invoking of the user-intended IoT device 102 from each of the number of IoT devices 102.

In the above embodiment, the ML module 320 incorporated in each of the number of IoT devices 102 may be configured to perform the comparison operation. In an embodiment, the ML module 320 may be configured to perform the comparison operation between the number of voice parameters and the number of pre-stored voice parameters for determining a similarity between the number of voice parameters and the number of pre-stored voice parameters.

In an embodiment, the number of pre-stored voice parameters may be stored in the data 306 stored in the memory 304 upon extraction. In an embodiment, the ML module 320 may be configured to identify the user-intended IoT device 102 amongst the number of IoT devices 102 with a maximum similarity between the number of voice parameters and the number of pre-stored voice parameters upon performing the comparison operation.

The ML module 320 may be configured to determine the user-intended IoT device amongst the number of IoT devices 102 based on the voice wakeup command. In an embodiment, the user-intended IoT device may be referred as the IoT device 102. The ML module 320 may be configured to determine the user-intended IoT device as a previously invoked IoT device based on the invoking data. The ML module 320 may be configured to determine the previously invoked IoT device based on the processed invoking data. In an embodiment, the ML module 320 may be configured to fetch the invoking data from the memory 304 pertaining to the ML module 320.

In an embodiment, the invoking data may define a relationship between the voice wakeup command and the previously invoked IoT devices 102 based on a number of previous voice wakeup commands. Furthermore, the ML module 320 may be configured to process the invoking data for determining a relationship between the voice wakeup command and the previously invoked IoT device based on the voice wakeup command and generate processed invoking data. Further, the ML module 320 may be configured to determine the previous invoked data based on the processed invoking data.

In the above embodiment, the ML module 320 may be configured to invoke the user-intended IoT device 102 selected amongst the number of IoT devices 102 based on one or more of a processing of the voice wakeup command, the similarity between the number of pre-stored voice parameters and the number of voice parameters, and the user-intended IoT device for waking up the selected IoT device 102.

Figure 4:
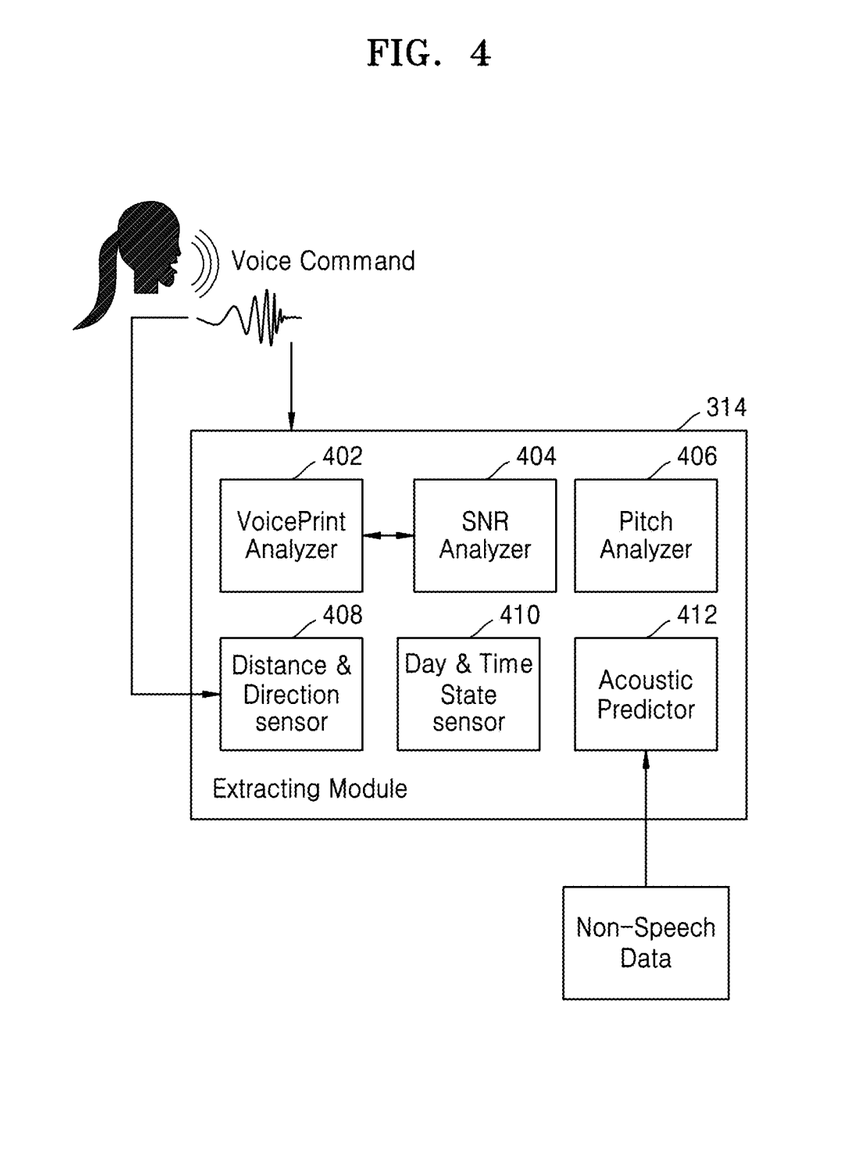
FIG. 4 illustrates a schematic block diagram of an extracting engine, in accordance with an embodiment.

FIG. 4 illustrates a schematic block diagram of the extracting module 314, in accordance with an embodiment. In an embodiment, the extracting module 314 may be configured to receive the voice wakeup command from a user for invoking the user-intended IoT device 102 amongst the number of IoT devices 102. Upon receiving voice wakeup command, the extracting module 314 may be configured to extract a number of voice parameters from the voice wakeup command. Examples of the number of voice parameters may include, but are not limited to, a Signal to Noise Ratio (SNR), distance of a voice wakeup command source (user) from the number of IoT devices 102, a direction of the voice wakeup command source, a time of receiving the voice wakeup command, a background noise, a voice print associated with the voice wakeup command, non-speech data. In an embodiment, the extracting module 314 may include a voice-print analyzer 402, a SNR analyzer 404, a pitch analyzer 406, a distance and direction sensor 408, a day and time state sensor 410, and an acoustic predictor 412.

In the above embodiment, the voice print analyzer 402 may be referred as the DSP chip as referred in the FIG. 3. Further, the voice print analyzer 402 may be configured to analyze the voice print from the voice wakeup command. In an embodiment, the voice print analyzer 402 may be configured to identify the user from a number of users based on the voice wakeup command for further categorization of the number of users.

In an embodiment, the SNR analyzer 404 may be configured to calculate an SNR value corresponding to the voice wakeup command. In an embodiment, the SNR value may vary within a range of 0 to 100. The SNR analyzer 404 may be configured to calculate the SNR value based on a formula "Sum of power for signal/Sum of power for noise".

Furthermore, the pitch analyzer 406 may be configured to determine a pitch value corresponding to the pitch. In an embodiment, the pitch value may be based on a frequency value, an intensity and a waveform corresponding to the voice wakeup command as received from the user by the extracting module 314. Upon determining the pitch value, the pitch analyzer 406 may be configured to categorize the pitch in one of a low level, a medium level, and a high level.

The distance and direction sensor 408 may be configured to capture sensor information related to a distance and a direction of the voice wakeup command source from the number of IoT devices 102. Further, the distance and direction sensor 408 may be configured to calculate a value associated with the distance and the direction based on the information related to the distance and the direction. In an embodiment, the distance may be calculated in terms of feet and the direction may be measured in terms of angle ranging between 0 and 180 degrees.

In an embodiment, the day and time state sensor 410 may be configured to determine a day and a time upon receiving the voice wakeup command from the voice wakeup command source. In an embodiment, the day and the time may be determined based on sensing a date and a time from system settings related to the number of IoT devices 102 upon receiving the voice wakeup command. Further, the day and time may be categorized in any of an early morning, a morning, an afternoon, an evening, a late evening, and a night.

Further, the acoustic predictor 412 may be configured to determine a background noise, and non-speech data from the voice wakeup command. In an embodiment, the acoustic predictor 412 may be configured to categorize the voice wakeup command in any of a silence, a noise, music, and an AC sound.

Figure 5:
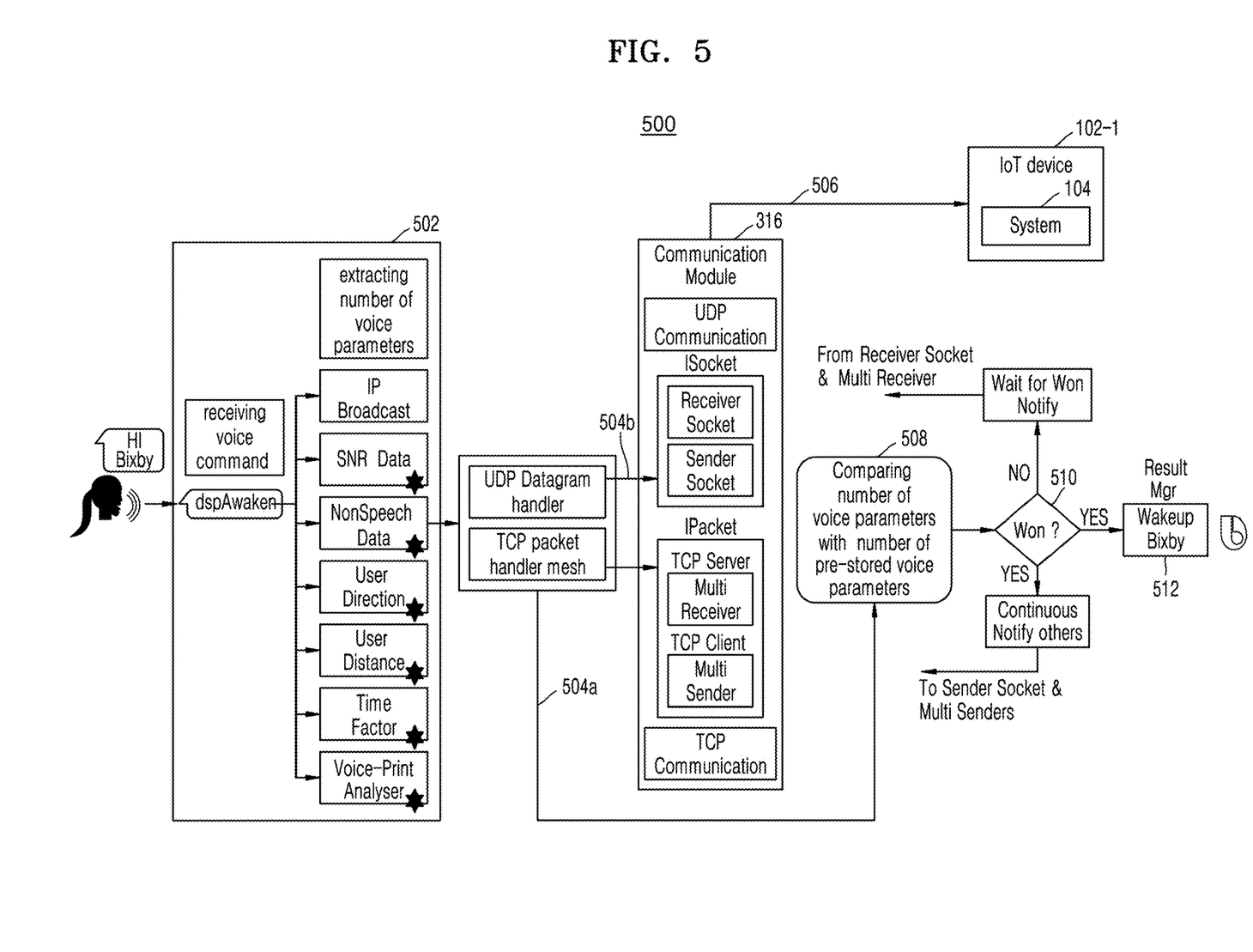
FIG. 5 illustrates an operation flow diagram depicting a process for invoking the user-intended IoT device amongst the number of IoT devices, in accordance with an embodiment.

FIG. 5 illustrates an operational flow diagram 500 depicting a process for invoking a user-intended IoT device 102 amongst the number of IoT devices 102, in accordance with an embodiment. In an embodiment, invoking the user-intended IoT device 102 may be based on a number of voice parameters extracted from a voice wakeup command. In an embodiment, the process may be performed by the system 214 upon receiving the voice wakeup command from the user. Examples of the number of voice parameters may include, but are not limited to, a Signal to Noise Ratio (SNR), distance of a voice wakeup command source from the number of IoT devices 102, a direction of the voice wakeup command source, a time of receiving the voice wakeup command, a background noise, a voice print associated with the voice wakeup command wake-up, and the previously invoked user device associated with handling one or more user requested actions. In an embodiment, the invoking may be based on one or more ML techniques.

In an embodiment, the process includes extracting the number of voice parameters (operation 502) from the voice wakeup command upon receiving the voice wakeup command at the extracting module 314. In an embodiment, the number of voice parameters may be received by a DSP chip incorporated in the extracting module 314. In an embodiment, the voice wakeup command may be received by each of the number of IoT devices 102 such that the extracting module in each of the IoT devices 102 may extract the number of voice parameters. The number of voice parameters may be stored in the data 306 of the memory 304.

Further, the process may proceed towards transmitting (operation 504a) the number of voice parameters for performing a comparison operation on the number of voice parameters within a same IoT device 102 amongst the number of IoT devices 102. In an embodiment, the comparison operation may be performed by the ML module 320 as referred in the FIG. 3.

Along with transmitting the number of voice parameters to the ML module 320, the process includes transmitting (operation 504b) the number of voice parameters to the sharing module 318 within the same IoT device 102 amongst the number of IoT devices 102.

In the above embodiment, the process may proceed towards sharing (operation 506) the number of voice parameters between the number of IoT devices 102. In an embodiment, the process may include sharing the number of voice parameters from each IoT device 102 with each of the number of IoT devices 102. In an embodiment, the sharing module 318 in each of the number of IoT devices 102 may be configured to transmit to other IoT devices and receive the number of voice parameters from the other IoT devices. In an embodiment, the process may further include determining the user-intended IoT device 102 for invoking amongst the number of IoT devices 102.

Furthermore, the process may proceed towards performing the comparison operation (operation 508) on the number of voice parameters received at the number of IoT devices 102. In an embodiment, the number of voice parameters may be compared with a number of pre-stored voice parameters. In an embodiment, the number of pre-stored voice parameters may be related to a number previous commands received at the number of IoT devices 102. In an embodiment, the number of pre-stored voice parameters may correspond to any of run-time data, and learned data.

In an embodiment, the learned data may include information identifying the IoT device 102 previously invoked based on the number of pre-stored voice parameters. Furthermore, the run-time data may correspond to at least one action performed based on the number of previous voice wakeup commands received at the number of IoT devices 102. In an embodiment, the learned data and the run-time data may be generated based on invoking of the number of IoT devices 102 and actions performed corresponding to the number of IoT devices 102 invoked based on the number of previous voice wakeup commands and the number of pre-stored voice parameters. In an embodiment, the run-time data and the learned data may be generated by the ML module 320. In an embodiment, pre-stored voice parameters may be previously stored in the memory 304.

In an embodiment, the comparison operation may be performed for determining a similarity between the number of voice parameters and the number of pre-stored voice parameters. Further, based on the similarity, the process includes determining the user-intended IoT device 102 also referred as the IoT device 102 amongst the number of IoT devices 102 for invoking.

In the above embodiment, the process may include determining the user-intended IoT device as a previously invoked IoT device amongst the number of IoT devices 102. In an embodiment, the user-intended IoT device may be determined as the previously invoked IoT device based on invoking data. In an embodiment, the invoking data may be fetched from the memory 304. In an embodiment, the process includes processing the invoking data for determining a relationship information between the voice wakeup command and the previously invoked IoT device based on the voice wakeup command and generate processed invoking data. Further, the process may include determining the user-intended IoT device as the previously invoked data based on the processed invoking data related to the number of IoT devices 102.

Accordingly, the process may proceed towards determining (operation 510) the user-intended IoT device 102 amongst the number of IoT devices 102 for invoking based on one or more of a processing of the voice wakeup command, the similarity between the number of pre-stored voice parameters and the number of voice parameters, and the user-intended IoT device. In an embodiment, upon selection of the user-intended IoT device 102 for invoking, the process includes transmitting a message from the IoT device 102 selected amongst the number of IoT devices 102 to remaining of the number of IoT devices 102. In an embodiment, the message may indicate the selection of the user-intended IoT device 102 for invoking. Further, the remaining of the number of IoT devices 102 not selected for invoking may be configured to wait for receiving the message from the IoT device selected for invoking.

The process may include invoking (operation 512) the user-intended IoT device 102 amongst the number of IoT devices 102 based on the voice wakeup command. In an embodiment the IoT device 102 selected for invoking may be the user-intended IoT device.

Figure 6:
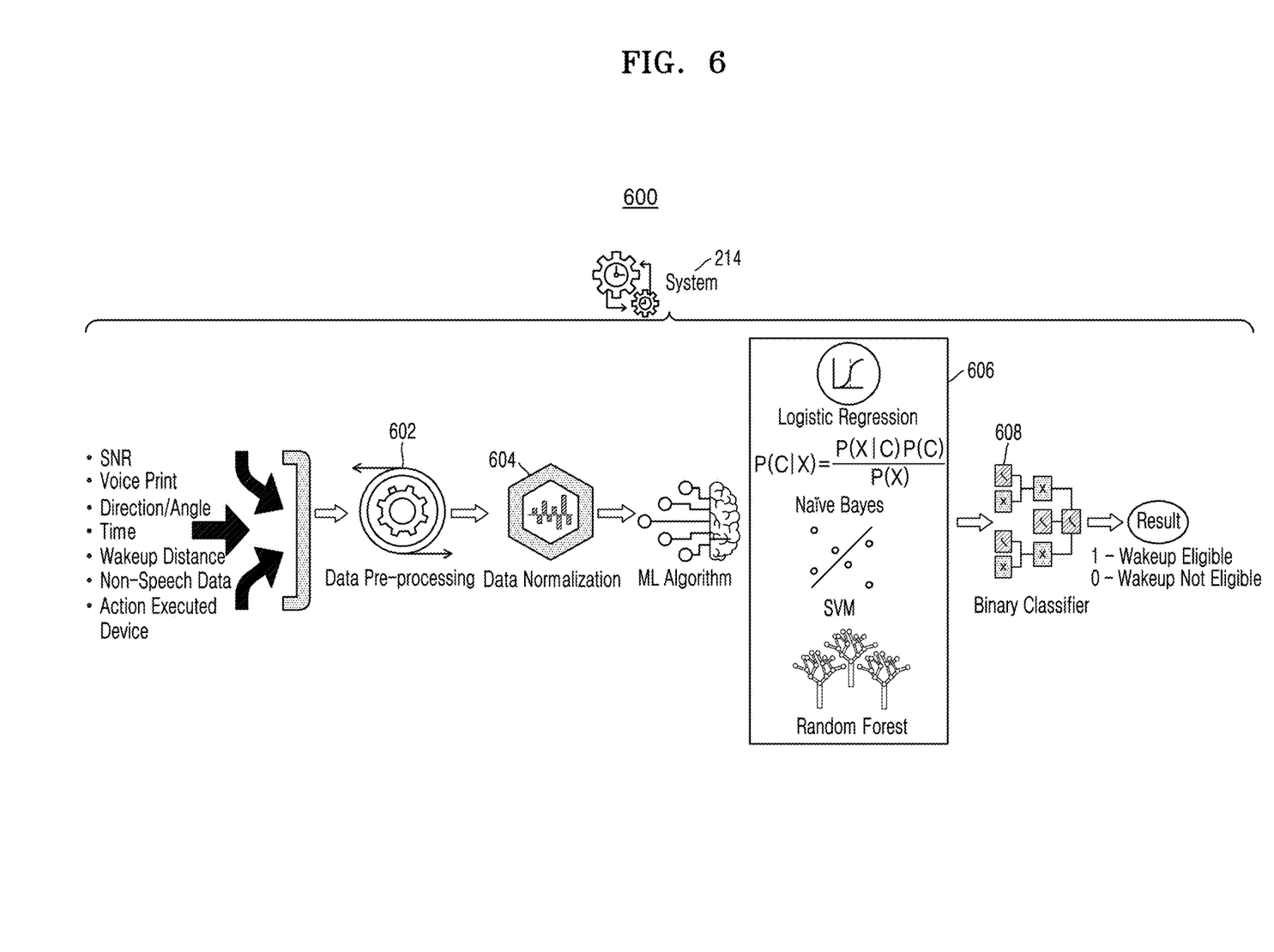
FIG. 6 illustrates an operational flow diagram depicting a process for determining the user-intended IoT device amongst the number of IoT devices for invoking, in an embodiment.

FIG. 6 illustrates an operational flow diagram 600 depicting a process for determining the user-intended IoT device 102 for invoking based on a voice wakeup command, in accordance with an embodiment. In an embodiment, determining may be based on one or more ML techniques such that a number of voice parameters extracted from the voice wakeup command may be processed through the one or more ML techniques. Examples of the number of voice parameters may include, but are not limited to, a Signal To Noise ratio, distance of a voice wakeup command source from the number of IOT devices, a direction of the voice wakeup command source, a time of receiving the voice wakeup command, a background noise, a voice print associated with the voice wakeup command wake-up, and the previously invoked user device associated with handling one or more user requested actions Furthermore, the processing for determining the user-intended IoT device 102 may be performed by the ML module 320 referred in the FIG. 3. In an embodiment, the one or more ML techniques may be employed at each of the number of IoT devices 102.

At operation 602, the process includes pre-processing the number of voice parameters associated with the voice wakeup command upon receiving at each of the number of IoT devices 102. Upon pre-processing the number of voice parameters, a pre-processed data based on the number of voice parameters may be generated as a result. Further, the pre-processed data may be based on the number of voice parameters.

At operation 604, the process includes performing normalization on the pre-processed data generated from the number of voice parameters at the operation 602.

At operation 606, the process includes performing upon the pre-processed data the one or more ML techniques. In an embodiment, examples of the one or more ML techniques may include, but are not limited to, logistic regression, Naïve Bayes, SVM, Random Forest, or the like. In an embodiment, the one or more ML techniques may be employed for determining the user-intended IoT device 102 amongst the number of IoT devices 102 intended by the user for invoking based on the voice wakeup command. As a result of employing the one or more ML techniques on the pre-processed data, a ML data may be generated related to the number of voice parameters and the voice wakeup command.

At operation 608, the process includes performing binary classification on the ML data generated at the operation 606. Upon performing the binary classification, the IoT device 102 as intended by the user for invoking may be determined.

Figure 7:
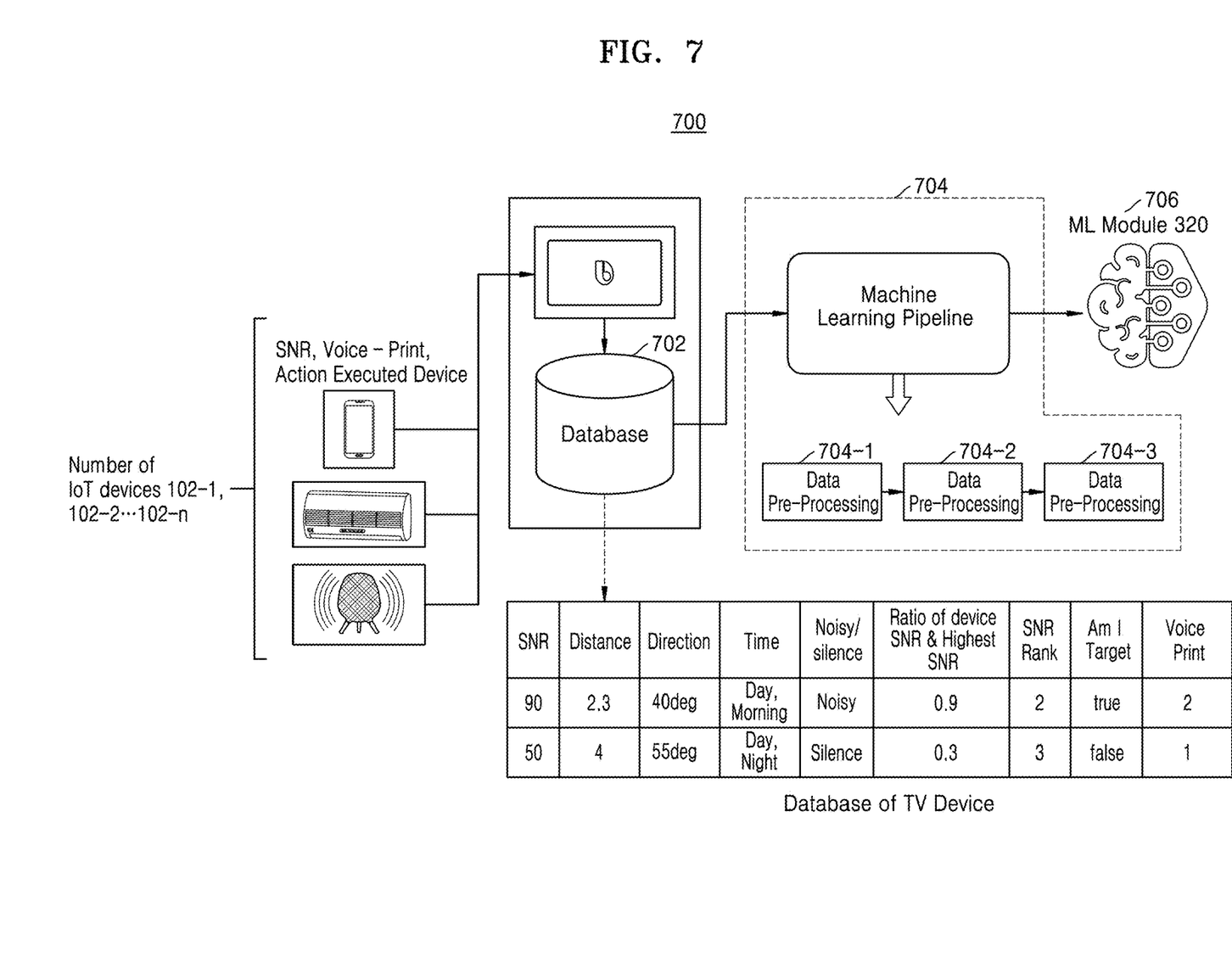
FIG. 7 illustrates an operational flow diagram depicting a process for learning phase for the system for determining the user-intended IoT device amongst the number of IoT device for invoking, in accordance with an embodiment.

FIG. 7 illustrates an operational flow diagram depicting a process for learning phase for the system 214 for determining the user-intended IoT device 102 amongst the number of IoT device 102 for invoking, in accordance with an embodiment. In an embodiment, the learning phase may be based on a number of voice parameters associated with a voice wakeup command. The learning phase may correspond to training of the ML module 320 for generating a learned data and a run-time data.

In an embodiment, the learned data may include information identifying the user-intended IoT device 102 previously invoked based on a number of pre-stored voice parameters. Furthermore, the run-time data may correspond to at least one action performed based on a number of previous voice wakeup commands received at the number of IoT devices 102. In an embodiment, the learned data and the run-time data may be generated based on invoking of the number of IoT devices 102 and actions performed corresponding to the number of IoT devices 102 invoked based on the number of previous voice wakeup command and the number of pre-stored voice parameters. In an embodiment, the run-time data and the learned data may be generated by the ML module 320. In an embodiment, the number of pre-stored voice parameters may be previously stored in the memory 304.

In an embodiment, the process includes receiving (operation 702) the number of voice parameters extracted from the voice wakeup command at a database stored in the memory 304. In an embodiment, the voice wakeup command may be received at the number of IoT devices 102 and further be stored in the memory 304.

Further, the process includes training (operation 704) a ML pipeline at the ML module 320 upon collecting required amount of data from the database corresponding to each of the number of IoT devices 102. In an embodiment, the required amount of data may correspond to the number of voice parameters pertaining to the voice wakeup command.

In an embodiment, training the ML pipeline may include pre-processing (operation 704-1) the number of voice parameters associated with the voice wakeup command. Upon pre-processing the number of voice parameters, a pre-processed data may be generated as a result.

In the above embodiment, the process includes performing normalization (operation 704-2) on the pre-processed data generated from the number of voice parameters at the operation 704-1.

The process includes performing (704-3) one or more ML techniques upon the pre-processed data for the training of the ML module 320. In an embodiment, examples of the one or more ML techniques may include, but are not limited to, logistic regression, Naïve Bayes, SVM, Random Forest, or the like.

Further, based on the training of the ML module 320, the system 214 may determine (operation 706) the user-intended IoT device 102 for invoking amongst the number of IoT devices based on the voice wakeup command. In an embodiment, the ML module post training may be a binary classifier configured to predict whether the voice wakeup command is intended for the any of the IoT device 102 or not.

Figure 8:
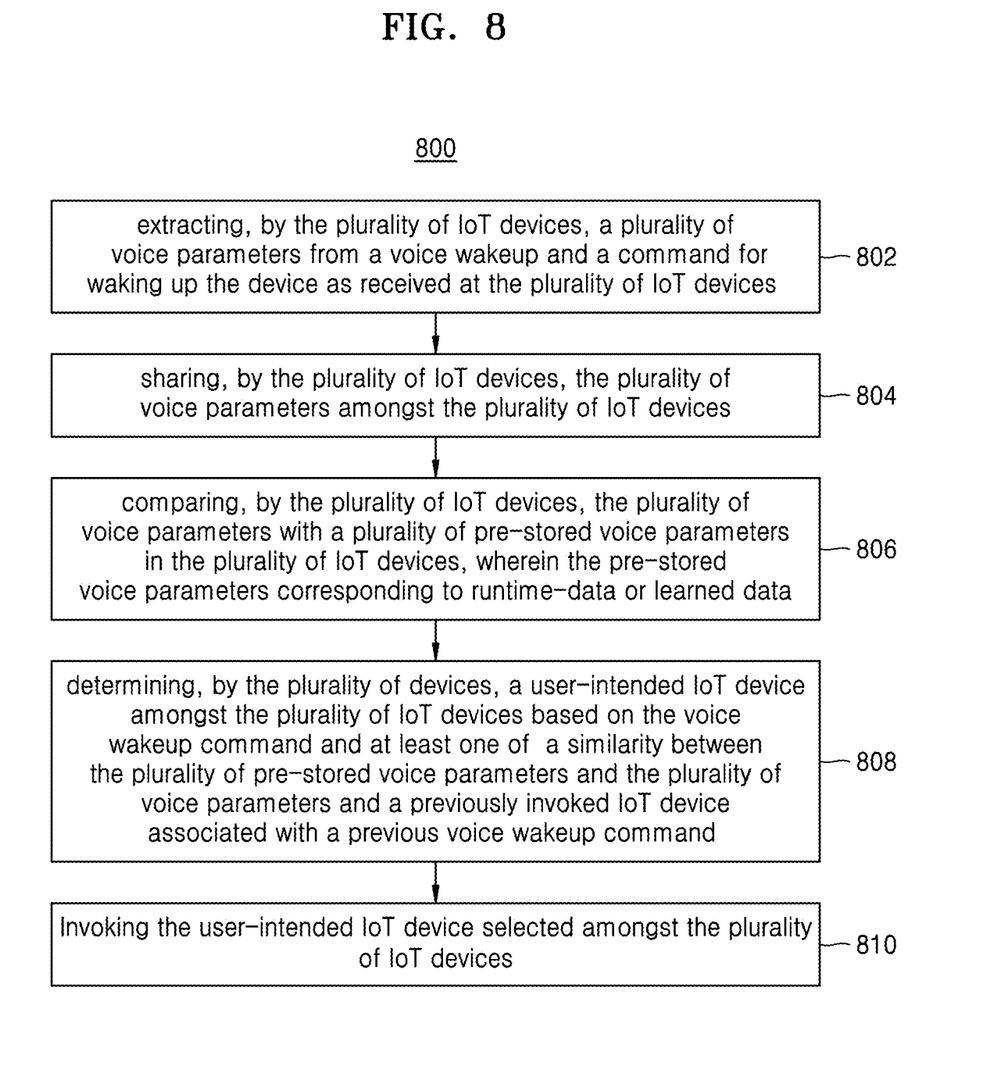
FIG. 8 illustrates a flow diagram of a method of invoking the user-intended IoT device amongst a number of IoT devices, in accordance with the embodiment.

FIG. 8 illustrates a flow diagram of a method 800 for invoking the user-intended IoT device 102 amongst the number of IoT devices 102, in accordance with an embodiment. The method 700 may be implemented by the system 214 using components thereof, as described above. In an embodiment, the method 800 may be executed by the extracting module 314, the communication module 316, the sharing module 318, and the ML module 320. Further, for the sake of brevity, details of the present disclosure that are explained in details in the description of FIG. 1 to FIG. 7 are not explained in detail in the description of FIG. 8.

In operation 802, the method 800 includes extracting, by the plurality of IoT devices, a plurality of voice parameters from a voice wakeup command for waking up the device as received at the plurality of IoT devices.

In operation 804, the method 800 includes sharing, by the plurality of IoT devices, the plurality of voice parameters amongst the plurality of IoT devices.

In operation 806, the method 800 includes comparing, by the plurality of IoT devices, the plurality of voice parameters with a plurality of pre-stored voice parameters in the plurality of IoT devices, wherein the pre-stored voice parameters corresponding to runtime-data or learned data.

In operation 808, the method 800 includes determining, by the plurality of devices, a user-intended IoT device amongst the plurality of IoT devices based on the voice wakeup command.

In operation 810, the method 800 includes invoking, an IoT device selected amongst the plurality of IoT devices based on one or more of a processing of the voice wakeup command, a similarity between the plurality of pre-stored voice parameters and the plurality of voice parameters, and the user-intended IoT device for waking up the selected IoT device.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for invoking a user-intended Internet of Things (IoT) device amongst a plurality of IoT devices, the method comprising:
   extracting, by the plurality of IoT devices, a plurality of voice parameters from a voice wakeup command for waking up a device received at the plurality of IoT devices;
   sharing, by the plurality of IoT devices, the plurality of voice parameters amongst the plurality of IoT devices;
   comparing, by the plurality of IoT devices, the plurality of voice parameters with a plurality of pre-stored voice parameters in the plurality of IoT devices, wherein the pre-stored voice parameters corresponding to runtime-data or learned data;
   determining, by the plurality of IoT devices, the user-intended IoT device amongst the plurality of IoT devices based on the voice wakeup command and at least one of a similarity between the plurality of pre-stored voice parameters and the plurality of voice parameters and a previously invoked IoT device associated with a previous voice wakeup command; and
   invoking the user-intended IoT device selected amongst the plurality of IoT devices.

2. The method as claimed in claim 1, wherein the determining the user-intended device comprises:
   processing, invoking data corresponding to the plurality of IoT devices, wherein the invoking data includes a relationship information between the voice wakeup command and the previously invoked IoT device invoked by the voice wakeup command; and
   determining, the previously invoked IoT device as a current invoked IoT device based on a processed invoking data corresponding to the plurality of IoT devices.

3. The method as claimed in claim 1, further comprising:
   transmitting a message from the user-intended IoT device selected amongst the plurality of IoT devices to remaining IoT devices, wherein the message includes an information to indicate a selection of the user-intended IoT device for invoking for the voice wakeup command.

4. The method as claimed in claim 1, further comprising:
   storing, by the plurality of IoT devices, the plurality of voice parameters with the plurality of pre-stored voice parameters in a database corresponding to each of the plurality of IoT devices upon receiving the plurality of voice parameters.

5. The method as claimed in claim 1, wherein the plurality of voice parameters is at least one of a signal-to-noise ratio, a distance of a voice wakeup command source from the plurality of IoT devices, a direction of the voice wakeup command source, a time of receiving the voice wakeup command, a background noise, a voice print associated with a voice wakeup command wake-up, and a previously invoked user device associated with handling one or more user requested actions.

6. The method as claimed in claim 5, further comprising:
analyzing a voice print that identifies a specific user from a plurality of users that have provided previous voice wakeup commands.

7. The method as claimed in claim 5, further comprising:
determining a pitch value based on a frequency value, an intensity, and a waveform, and
categorizing the pitch value into one of a low level, medium level, high level.

8. The method as claimed in claim 5, further comprising:
determining the time based on sensing a date and a time from system settings related to the plurality of IoT devices; and
categorizing the day and time in one of an early morning, a morning, an afternoon, an evening, a late evening, and a night.

9. The method as claimed in claim 5, further comprising:
categorizing the background noise in any of a silence, a noise, music, and an AC sound.

10. The method as claimed in claim 5, wherein the Signal-to-Noise ratio is based on a formula of "sum of power for signal"/"sum of power for noise".

11. A system for invoking a user-intended Internet of Things (IoT) device amongst a plurality of IoT devices, the system comprising:
a plurality of IoT devices, each of the plurality of IoT devices includes:
an extracting module configured to extract a plurality of voice parameters from a voice wakeup command for waking up a device received at the plurality of IoT devices;
a sharing module configured to share the plurality of voice parameters amongst the plurality of IoT devices; and
a machine learning (ML) module configured to:
compare the plurality of voice parameters with a plurality of pre-stored voice parameters in the plurality of IoT devices, wherein the pre-stored voice parameters corresponding to runtime-data or learned data;
determine the user-intended IoT device amongst the plurality of IoT devices based on the voice wakeup command, and at least one of a similarity between the plurality of pre-stored voice parameters and the plurality of voice parameters and a previously invoked IoT device associated with a previous voice wakeup command; and
invoke, the user-intended IoT device amongst the plurality of IoT devices.

12. The system as claimed in claim 11, wherein, the ML module is further configured to:
process, invoking data corresponding to the plurality of IoT devices, wherein the invoking data includes a relationship information between the voice wakeup command and the previously invoked IoT device invoked by the voice wakeup command; and
determine, the previously invoked IoT device as a current invoked IoT device based on a processed invoking data corresponding to the plurality of IoT devices.

13. The system as claimed in claim 11, wherein a message is transmitted from the user-intended IoT device selected amongst the plurality of IoT devices to remaining IoT devices, wherein the message includes an information to indicate a selection of the user-intended IoT device for invoking for the voice wakeup command.

14. The system as claimed in claim 11, wherein the plurality of IoT devices are configured to store the plurality of voice parameters with the plurality of pre-stored voice parameters in a database corresponding to each of the plurality of IoT devices upon receiving the plurality of voice parameters.

15. The system as claimed in claim 11, wherein the plurality of voice parameters is at least one of a signal-to-noise ratio, a distance of a voice wakeup command source from the plurality of IoT devices, a direction of the voice wakeup command source, a time of receiving the voice wakeup command, a background noise, a voice print associated with the voice wakeup command, and a previously invoked user device associated with handling one or more user requested actions.

16. The system as claimed in claim 15, further comprising:
analyze a voice print that identifies a specific user from a plurality of users that have provided previous voice wakeup commands.

17. The system as claimed in claim 15, further comprising:
determine a pitch value based on a frequency value, an intensity, and a waveform, and
categorizing the pitch value into one of a low level, medium level, high level.

18. The system as claimed in claim 15, further comprising:
determine the time based on sensing a date and a time from system settings related to the plurality of IoT devices; and
categorize the day and time in one of an early morning, a morning, an afternoon, an evening, a late evening, and a night.

19. The system as claimed in claim 15, further comprising:
categorize the background noise in any of a silence, a noise, music, and an AC sound.

20. The system as claimed in claim 15, wherein the Signal-to-Noise ratio is based on a formula of "sum of power for signal"/"sum of power for noise".

* * * * *